United States Patent [19]

Jennings et al.

[11] 4,331,587
[45] May 25, 1982

[54] RESIN STABILIZER SYSTEMS OF ORGANOTIN SULFUR-CONTAINING COMPOUNDS AND METAL COMPOUNDS

[75] Inventors: Thomas C. Jennings, Lyndhurst; Charles W. Fletcher, Jr., Highland Heights, both of Ohio

[73] Assignee: Dart Industries, Inc., Northbrook, Ill.

[21] Appl. No.: 98,679

[22] Filed: Nov. 29, 1979

Related U.S. Application Data

[60] Division of Ser. No. 353,910, Apr. 23, 1973, abandoned, which is a continuation-in-part of Ser. No. 116,671, Feb. 18, 1971, Pat. No. 3,764,571.

[51] Int. Cl.³ .................................................. C08K 5/58
[52] U.S. Cl. .............................. 524/181; 252/400 R; 524/180
[58] Field of Search ......... 260/23 XA, 42.49, 45.75 S, 260/45.7 R; 252/400 R

[56] References Cited

U.S. PATENT DOCUMENTS

| | | | |
|---|---|---|---|
| 2,256,625 | 9/1941 | Quattlebaum | 260/45.95 |
| 2,403,215 | 7/1946 | Foster | 260/42.49 |
| 3,627,717 | 12/1971 | Kuhnen | 260/23 XA |
| 3,732,178 | 5/1973 | Kuhnen | 260/23 |

OTHER PUBLICATIONS

British Plastics, May 1957, pp. 183 to 186 and Sep. 1952, pp. 304 to 307.
Modern Plastics, Dec. 1949, pp. 111 to 112, 114, 116 and 156 to 162.

*Primary Examiner*—V. P. Hoke

[57] ABSTRACT

A resin stabilizer composition which essentially contains:
(a) an organotin sulfur-containing compound, for example, organotin mercaptides, organotin mercaptoacids, organotin mercaptoacid esters, organotin sulfides, organothiostannoic acids and the like, and
(b) a metal compound from one of the groups of
  (1) an alkali metal bisulfite, carbonate, hydroxide, oxide, thiocarbonate bicarbonate, or metabisulfite, and
  (2) an alkaline earth metal oxide or hydroxide.

These compositions remarkably contribute to the long term heat stability of vinyl halide resins. Furthermore, among other advantages, significant economies and synergistic resin heat stabilization are offered by these stabilizer compositions.

13 Claims, No Drawings

4,331,587

RESIN STABILIZER SYSTEMS OF ORGANOTIN SULFUR-CONTAINING COMPOUNDS AND METAL COMPOUNDS

RELATED APPLICATION

This application is a divisional of application Ser. No. 353,910 filed Apr. 23, 1973 now abandoned, which in turn, is a continuation-in-part of our co-pending application, Ser. No. 116,671 filed Feb. 18, 1971, and now U.S. Pat. No. 3,764,571.

BACKGROUND OF THE INVENTION

In U.S. Pat. No. 3,764,571, organotin stabilizer systems are described, particularly suited for the stabilization of vinyl halide resins against degradation by heat. Such stabilizer systems permit resins to be molded and worked under the action of heat into many useful articles. In accordance with that application, a composition comprising an organotin sulfur-containing compound, a metal carboxylate and a metal base remarkably contributes to vinyl halide resin heat stability. This three-component composition also provides for a very efficient utilization of the rather expensive organotin sulfur-containing component. Heat stabilities were achieved with the three-component novel compositions which are unobtainable at the same total levels of the individual components when used alone or in two-component combinations with one another. It was also found, as disclosed and exemplified in that application, that a metal base component, alone, contributed to the heat stabilization of vinyl halide resins in the presence of the organotin sulfur-containing compound. This application develops more fully the combination of an organotin sulfur-containing compound and a metal compound and the stabilizing synergisms embodied by such combinations.

SUMMARY OF THE INVENTION

The present invention is directed to improvements in resin stabilizer systems of organotin sulfur-containing compounds. This invention is predicated in part upon the unexpected heat stabilization of vinyl halide resins by organotin sulfur-containing compounds in combination with certain types of metal compounds.

In particular, a metal compound selected from one of the groups of (1) an alkali metal bisulfite, carbonate, hydroxide, oxide, thiocarbonate, bicarbonate or metabisulfite and (2) an alkaline earth metal oxide or hydroxide, and an organotin sulfur-containing compound together contribute highly unexpected heat stabilization to a vinyl halide resin. We have found that synergistic heat stabilizations are provided by our compositions, i.e., the sum of the stabilizing effects of an amount of each component alone upon the resin is exceeded when the same amounts of components are together in the resin formula.

Other seemingly chemically similar metal compounds have not been found by us to provide synergistic effects with the organotin component. For instance, based upon our findings of synergisms and amounts of components where synergism might be found, other seemingly chemically similar metal compounds do not display heat stabilizing synergism with the organotin component. The exact chemical mechanisms for the unexpected behaviors of our stabilizer compositions in vinyl halide resins are not completely understood. Nevertheless, such unexpected results and other advantages are empirically demonstrated in numerous operating examples of this invention, and a further understanding thereof will become apparent in view of the detailed description herein. In the stabilizer compositions of organotin sulfur-containing compounds and metal compounds of this invention, the benefits of stabilization can be realized over broad ranges of both total parts by weight of the stabilizer compositions in the vinyl halide resin and the weight ratios of each of the components with respect to the other. Particularly useful stabilizer compositions of this invention are achieved with a total parts by weight range on the order of about 0.2 to about 15 parts by weight based upon 100 parts by weight (phr) of the vinyl halide resin. A most useful range of total parts by weight of stabilizer composition is on the order of about 0.5 to about 10 phr and this depends upon the desired heat stability in a particular vinyl halide resin composition consistent with other requirements and economies.

There are certain generally preferred weight ratios of the organotin sulfur-containing compounds relative to a particular metal component. This will become apparent in view of the detailed operating examples. However, it is to be emphasized that the most desirable weight ratios of each of the essential components of the composition of this invention for a particular application and resin system can be arrived at in accordance with the teachings of this invention. Thus, in its broader aspects, this invention is not limited to weight ratios of components. It has been found that synergistic stabilization levels of a particular metal compound and a particular organotin sulfur-containing compound will vary as exemplified by the combination of sodium carbonate and dibutyltin bis (isooctylthioglycolate). This combination has a synergistic effectiveness when an amount in the range of 0.1–10 phr of sodium carbonate is combined with an amount of organotin in the range of about 0.1–4 phr. Higher levels of each component may be used. In contrast, the sodium carbonate alone in the vinyl halide resin will not materially contribute any heat stability when present in the range of 0.1–10 phr, or higher. On the other hand, the heat stability of a vinyl halide resin is enhanced with increasing amounts of the dibutyltin compound employed by itself in the 0.1–4 phr range. But, when the amounts of such a dibutyltin compound are employed with amounts of otherwise ineffective sodium carbonate, heat stabilities are achieved which far exceed the expected results. In general, the combination of metal compound with the organotin sulfur-containing compound is utilized at total parts on the order of about 0.2 to about 15 phr; and where the metal compound is within the range of about 0.1 to about 10 phr and the organotin compound is in the range of about 0.1 to about 5 phr.

ORGANOTIN SULFUR-CONTAINING COMPONENT

The organotin sulfur-containing compounds which are of use in this invention are generally characterized as having a sulfur-containing radical or atom attached to the tin through the sulfur atom and a hydrocarbon or substituted hydrocarbon group directly attached to the tin through a carbon atom, i.e., compounds containing the

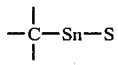

group. These compounds can also be characterized by the formula R—Sn—S wherein R represents a mono or polyvalent hydrocarbon or non-hydrocarbon substituted hydrocarbon radical. As mentioned, this combination of R—Sn—S bonds has been heretofore recognized as giving optimum stabilization. The tin bonds are usually derived from polyvalent tin by having at least one valence for bonding to the sulfur atom while the remaining valence or valences are for bonding with a hydrocarbon radical. Tin usually acts as a bi- or tetravalent atom, but coordination complexes of tin are known where the tin behaves in even a higher valence state and, therefore, the valence state of tin can vary in the organotin compounds which can be used in this invention.

Generally, however, most organotins suitable for use in this invention are derived from tetravelent tin. Of the types of organotin compounds contemplated, included are organotin mercaptides which may be characterized by the Formula I:

wherein R and R' represent hydrocarbon or substituted hydrocarbon radicals selected from the group consisting of alkyl, aryl, oxyalkyl, oxyaryl and the furfuryl and tetrahydrofurfuryl radicals, and x is an integral number from 1 to 3. Examples of such groups are alkyls such as methyl, ethyl, butyl, octyl, dodecyl, and octadecyl; aryls such as phenyl, tolyl, naphthyl or xylyl; oxyalkyl and oxyaryl, such as propyloxide, butyloxide, octyloxide, benzyloxide; and the furfuryl and tetrahydrofurfuryl groups. Specific examples of organotin mercaptides in which R and R' are butyl, for example, and x varies from 1 to 3 are monobutyltin tributylmercaptide, dibutyltin dibutylmercaptide and tributyltin monobutylmercaptide. Patents exemplifying this formula $R_xSn(SR')_{4-x}$ or a similar formula and a definition of compounds represented thereby include U.S. Pat. Nos. 2,641,588; 2,641,596; 2,648,650; 2,726,254 and 2,789,963, among others.

While the simplest representatives of the organotin sulfur-containing compounds are the organotin mercaptides of the Formula I, $R_xSn(SR')_{4-x}$, as stated herein above, the important components of the compounds are the organotin group and the tin-sulfur group. The organotins and therefore, not limited to the components of this formula, but are shown by all compounds in which a sulfur atom or mercapto radical is bound through the sulfur atom to the tin atom of the organotin radical, i.e., those organotins containing the R—Sn—S bonds. These compounds may be further defined by the Formula II.

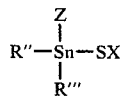

wherein R", R'", SX and Z have the following significance: R" and R'" may be different monovalent hydrocarbon radicals or substituted hydrocarbon radicals, but will be generally the same radicals because the starting materials for the preparation of the organotin mercapto compounds will be generally the di-(or tri-) hydrocarbon tin halides or oxides available in commerce. The nature of these groups has in most cases no, or only a very minor, influence on the properties of the end products. R" and R'" may be aliphatic, aromatic, or alicyclic groups such as methyl, ethyl, propyl, butyl, amyl, hexyl, octyl, lauryl, allyl, benzyl, phenyl, tolyl, naphthyl and cyclohexyl, or substituted hydrocarbon groups of these groups having —OH, —NH$_2$, —CN, etc., radicals in the molecule such as cyanoethyl (of the type described in U.S. Pat. No. 3,471,538), and the like.

The group SX of Formula II, for instance, may be sulfur alone, the rest of a mercaptan, or a mercapto alcohol, or of an ester of a mercapto alcohol or mercapto acid. The patents mentioned above in the background of our copending application give examples of this. Aliphatic and aromatic mercaptans may be employed to form the group SX. In the case of aliphatic mercaptans, those having 8 to 18 carbon atoms, e.g., decyl or dodecyl mercaptan are usually preferred because the lower mercaptans are unsuitable for the preparation and use of the stabilizers on account of their offensive smell. Suitable aromatic mercaptans are, for instance, thionaphthol, thiobenzyl alcohol, phenoxyethyl mercaptan, phenoxyethyl mercaptan, and others. As examples of suitable mercapto alcohols, monothioethylene glycol, monothiopropylene glycol, thioglycerol, thiodiethylene glycol, and others may be mentioned. Particularly suitable are the esters of these mercapto alcohols in which the hydroxy groups are esterified by an aliphatic, aromatic, or alicyclic saturated or unsaturated monocarboxylic acid. Readily available mercaptoacid esters are the esters of thioglycolic acid, such as ethyl thioglycolate, isooctylthioglycolate, and generally the esters of mono and dibasic aliphatic and aromatic mercapto acids, such as esters of beta thiopropionic acid, thiolactic acid, thiobutyric acid and mercapto lauric acid. It will be understood that the recited examples for group SX apply to SR' of Formula I and the examples of R" or R'" apply to R or R' of Formula I.

The group Z of Formula II may be a monovalent hydrocarbon radical like R" and R'", in which case the compound is a tri-hydrocarbon tin mercapto compound. The three hydrocarbon groups may have the same or different composition. Z may also be a sulfur alone or the rest of a mercapto compound linked through the S atom to the tin atom, in which case it may have the same composition as SX or a different composition. The former case represents a dihydrocarbon tin dimercapto compound and the latter case represents a mixed mercapto derivative of the dihydrocarbon stannanediol. In another sub-group, Z may be the rest of an alcohol or of a carboxylic acid linked through the oxygen of the alcoholic hydroxyl group or of the carboxylic acid group to the tin atom. Such compounds can be defined as monoesters or monoethers of hydrocarbon substituted stannanediol, in which the second hydroxyl group of the stannanediol is replaced by a mercapto compound. Thio alcohols and acids which are capable of forming such ether and ester groups are illustrated in the patents cited in the background of our copending application along with their methods of preparation. Other specific references to organotin sulfur-containing compounds as widely described in the patent art include U.S. Pat. No. 2,641,588, col. 1, lines 32–53 to col. 2, lines 13-46; U.S. Pat. No. 2,641,596, col. 1, lines 10-44; U.S. Pat. No. 2,726,254, col. 1, line 63 to col. 2, line 19; U.S. Pat. No. 2,789,963, col. 2, lines 35-60; U.S. Pat. No. 2,914,506, col. 1, line 59 to col. 4, line 8; U.S. Pat. No. 2,870,119, col. 1, lines 27-53 and U.S. Pat. No. 3,126,400, col. 1, lines 21-61. Other patents exemplifying these organotin sulfur-containing compounds include U.S. Pat. Nos. 3,069,447; 3,478,071; 2,998,441; 2,809,956; 3,293,273; 3,396,185; 3,485,794; 2,830,067 and 2,855,417.

Other organotin sulfur-containing compounds which are within the scope of this invention are characterized by the following Formula III:

$$(RSnS_{1.5})_n$$

wherein R is defined as above, S is sulfur and n is an integral number from about 2 to about 1000. These polymeric compounds are described in the patent literature, for example, at U.S. Pat. No. 3,021,302 at col. 1, line 60 to col. 2, line 17; U.S. Pat. No. 3,424,712 at col. 3, line 34 to col. 4, line 2; and U.S. Pat. No. 3,424,717 at col. 3, line 13, to col. 4, line 21. Specific reference is made to these patents at the referenced columns for more details. Other polymeric tin mercaptide type compounds having the R—Sn—S bonds characterizing the organotin sulfur-containing compounds suitable for use in this invention are exemplified in U.S. Pat. Nos. 2,809,956; 3,293,273; 3,396,185 and 3,485,794 and these exemplifications are incorporated herein by reference.

Of course, it is obvious that organotin mercaptides, organotin mercaptoacids, organotin mercaptoacid esters, etc., per se form no part of this invention and the mentioned patents and their specific disclosures clearly teach these compounds and their method of production to enable anyone of ordinary skill to use them in carrying out this invention. Other literature references which are incorporated herein and which pertain to the organotin sulfur-containing component having the R—Sn—S group to exemplify the scope intended for this component in accord with the principles of this invention, include "The Development Of The Organotin Stabilizers", by H. Verity Smith, Tin Research Institute, Greenford, Middlesex, Pp. 15-22, (December, 1959).

METAL COMPOUND

A metal compound for use in our compositions is selected from one of the groups of (1) an alkali metal bisulfite, carbonate, hydroxide, oxide, thiocarbonate, bicarbonate or metal bisulfite, and (2) an alkaline earth metal oxide or hydroxide. Compounds in group (1) have been found to provide heat stability synergism in our composition. Seemingly similar alkali compounds have not been found by us as mentioned above to provide such results. Group (1) compounds also offer premium stabilization with the organotin compounds at considerable savings; and wide flexibility of amounts for different resin molding and working temperatures. Compounds in group (2) also provide synergism with other advantages similar to group (1) metal compounds. For example, calcium hydroxide, barium hydroxide and strontium hydroxide synergistically function; whereas other seemingly similar alkaline compounds we have found do not so function. Each group (1) to (2) or each metal compound within the group offers separate and distinct advantages in the stabilization of resin systems. While our invention brings these metal compounds together as a class principally because of their unique behaviors with organotin sulfur-containing compounds and their unobvious properties, it will be appreciated, in view of this description, that distinct advantages are associated with each of the members of this class.

The principles of this invention and its operating parameters will be further understood with reference to the following detailed examples which serve to illustrate the types of specific materials and their amounts as used in typical vinyl halide resin formulations and the synergisms displayed by the essential combination of components in the stabilizer composition according to this invention. These examples are considered to be exemplary of this invention, and should not be considered as limiting, especially in view of applicants' broad disclosure of principles of this invention.

In the examples which follow, a standard resin formula was employed which contained 200 parts by weight of polyvinyl chloride homopolymer which is characterized as a white powder having a particle size such that 100% passes through a 42 mesh screen at a specific gravity of 1.40 (Geon 103 EP by B. F. Goodrich). Included in the standard resin formula is also 6 parts by weight of a processing aid which is an acrylic polymer in powdered form which improves the hot processing of rigid and plasticized vinyl compounds. (Acryloid K120N by Rohm and Haas Company). This material is a fine, white free flowing powder having a bulk density at about 0.30 grams per cc and a viscosity, 10% in toluene, at 600 cps (Brookfield). The processing aid merely facilitates hot processing and forms no part of this invention. A paraffin wax lubricant, i.e., a commercial wax designated 165 (H. M. Royal, Inc.) was also employed at 2 parts by weight in the resin formula. The term "standard resin blank" or just "blank" is used hereinafter to designate the standard resin formula without heat stabilizer additives. Various combinations of the organotin sulfur-containing compounds and metal compounds were mixed into the standard resin formula according to the following examples on a parts by weight basis. All amounts of such stabilizer components, in the tables and examples unless otherwise indicated, are on a parts per hundred resin basis, or as indicated above, simply "phr". The blank resin formula with and without stabilizer additives are tested in the following examples by first milling the mixtures to form a uniform polyvinylchloride composition for five minutes at 350° F., after which time long term heat stabilities of test samples were determined by oven treatment at either of two temperatures, 375° F. or 400° F., as indicated. The heat stability contribution of the stabilizer compositions (or components thereof) hereinafter are determined by ascertaining the number of minutes at the test temperature required for the samples to degrade by darkening usually to dark red or black. Thus, the term "heat stability contribution" is used to indicate the amount of heat stability in minutes contributed by a composition or component to the resin blank formula.

EXAMPLES 1-55

In Examples 1-55, the synergistic performance of the combination of sodium carbonate and dibutyltin bis (isooctylthioglycolate), hereinafter "DBT", was demonstrated. For this purpose, the heat stability of the standard resin blank in the absence of either the organotin compound or metal compound was determined by milling at 350° F. and long term heat stability testing at 375° F. The standard resin blank was pink or orange off the mill and darkened within 10 minutes at 375° F. This demonstrated that the blank resin will degrade quickly. This blank was thus given the numerical designation "0" at zero parts of either component, as shown in the upper left hand corner of Table I. For comparison with the standard resin blank, varying amounts of sodium carbonate over the range of about 0.1 to about 10 phr were employed alone. The results of these examples are shown in the first horizontal line of Table I. Also, a series of examples in which the standard resin formula was combined with DBT alone were performed for comparison. The results of these examples are shown in the first vertical line of Table I. Then, the combination of sodium carbonate and DBT varying in amounts of 0.1–10 phr of sodium carbonate with 0.1–4.0 phr DBT were performed to illustrate the synergistic heat stabilizing effects in minutes.

Table I which follows demonstrates the results of the fifty-five examples (the one blank space in the table indicates no test was made). The times in minutes reported in Table I for darkening or blackening take into account the standard resin blank which degraded within about 10 minutes of heat stability testing. In other words, the time in minutes recorded at various levels for sodium carbonate and DBT alone, and in combination with one another, represent the "contribution" in minutes of either one or both of these components to the standard resin blank.

TABLE I

HEAT STABILITY CONTRIBUTION MINUTES FOR INCREASING AMOUNTS (phr) OF $Na_2CO_3$ AND DIBUTYLTIN BIS (ISOOCTYLTHIOGLYCOLATE) AT 375° F.

| | | | | | $Na_2CO_3$ | | | | |
|---|---|---|---|---|---|---|---|---|---|
| | | 0 | .1 | .25 | .5 | 1.0 | 2.0 | 5.0 | 10 |
| | 0 | 0' | 0' | 0' | 10' | 10' | 10' | 10' | 10' |
| | .1 | 10' | 10' | 10' | 10' | 20' | 30' | 30' | 20' |
| | .25 | 10' | 10' | 20' | 25' | 40' | 50' | 40' | 30' |
| DBT | .5 | 20' | 20' | 30' | 40' | 60' | 90' | 90' | 70' |
| | 1.0 | 40' | 50' | 55' | 70' | 90' | 150' | 110' | 110' |
| | 2.0 | 90' | 110' | 120' | 130' | 150' | 190' | 190' | |
| | 4.0 | 200' | 230' | 230' | 240' | 270' | 270' | 310' | 270' |

Referring to Table I, at 0.1–0.5 phr of sodium carbonate alone, stability of the blank was not improved. At higher levels on the order of about 1 to about 10 phr of sodium carbonate alone, the heat stability of the blank was improved, at most about 10 minutes. In contrast, the DBT alone at about 0.1 phr contributed about 10 minutes of heat stabilizing effectiveness to the blank and, with increasing amounts up to 4 phr, the heat stability was enhanced to about 200 minutes. Therefore, in general, the sodium carbonate component of the stabilizer combination contributed only slightly at higher levels on the order of 1 to about 10 phr to the heat stability of the blank formula. Whereas, DBT with increasing amounts contributed significantly to the heat stability of the blank.

When the sodium carbonate and DBT were combined in varying amounts as Table I demonstrates, at lower levels of sodium carbonate on the order of 0.1 to about 1 phr in combination with 0.1 phr DBT, unexpected heat stability was not clearly observed. Quite similarly, when DBT on the order of 0.1–0.5 phr was combined with 0.1 phr of sodium carbonate, unexpected heat stability was not clearly observed. However, when sodium carbonate within the range of 0.1 to about 10 phr was combined with DBT at various levels from about 0.1 to 4 phr, significant synergism was observed. To illustrate this, reference is made to Table I in which 1 part of sodium carbonate alone contributed at most about 10 minutes of heat stability to the blank. For comparison, one part of DBT contributed about 40 minutes of heat stability to the blank. Thus, the expected heat stability of a combination of 1 phr of sodium carbonate and 1 phr DBT should have been about 50 minutes. However, as demonstrated by Table I, the heat stability of such a combination was 90 minutes and synergism thus was clearly demonstrated.

In the range of 0.1–10 phr of sodium carbonate, there was a level of DBT in the range of 0.1–4 phr which when combined with the sodium carbonate provided for a synergistic result. Such levels are easily determined from Table I. It was only at a lower level of about 0.1 sodium carbonate when the DBT was between 0.1 and 0.5 phr that synergism was not clearly demonstrated at 375° F.; and similarly at levels between about 0.25–1 phr sodium carbonate at 0.1 phr DBT. However, as highlighted in the area encompassed by the double black lines of Table I, with few exceptions, principally in the lower phr of each component of the combination tested, synergism was observed. Such a comprehensive demonstration can be extended to other higher levels of components and a similar table can be prepared to ascertain all levels of synergism for the combinations of all components according to the principles of this invention. However, within the teachings of this invention, one of ordinary skill can attend to such further details.

EXAMPLES 56–61

These examples demonstrated the synergistic combination of calcium hydroxide and an organotin sulfur-containing compound, that is DBT, for comparison with previous examples. In Examples 56 and 57, calcium hydroxide was employed alone at levels of 0.1 phr and 10 phr, respectively, in the standard resin formula. Examples 58–61 demonstrated the combination of calcium hydroxide and DBT for synergistic heat stabilizing effectiveness upon milling and oven testing at 375° F. as indicated above. The results are recorded in Table II.

The Table II results can also be compared with Examples 3 and 5 of our above mentioned copending application and such examples are incorporated herein by reference, realizing the different reporting method and different test conditions employed.

TABLE II

| | Components | 375° F. Heat Stability Contribution |
|---|---|---|
| Example 56 | 0.1 calcium hydroxide | 0' |
| Example 57 | 10 calcium hydroxide | 0' |
| Example 58 | 0.25 DBT 0.25 calcium hydroxide | 10' |
| Example 59 | 0.25 DBT 1.0 calcium hydroxide | 40' |
| Example 60 | 0.5 DBT 0.25 calcium hydroxide | 25' |
| Example 61 | 0.5 DBT 1.0 calcium hydroxide | 60' |

In Examples 56 and 57 of Table II, calcium hydroxide at levels of 0.1 and 10 phr did not contribute to the heat stability of the blank. In both instances, even at such low and high levels, no extension of heat stability was observed at 375° F. As previously demonstrated in Table I, DBT alone exhibited a heat stabilizing effectiveness over the range of 0.1 to about 4 phr. In Example 58 where 0.25 phr DBT and 0.25 phr calcium hydroxide were employed in combination, the heat stability of the combination was about 10 minutes. Therefore, at this low level of each component in the stabilizer combination, synergistic results were not clearly observed. However, in Example 59 at 0.25 phr DBT and 1.0 phr calcium hydroxide, a heat stability of 40 minutes was contributed to the blank. In contrast, the expected heat stability of such a combination would have been only 10 minutes since 0.1 to 10 parts of calcium hydroxide alone did not contribute to the heat stability of the blank and 0.25 part DBT contributed only 10 minutes (Table I). Accordingly, the 40 minutes heat stability for the combination far exceeded the expected heat stability of only 10 minutes, judging from the performance of each of the components alone. Quite similarly, Examples 60–61 at the levels of the DBT and calcium hydroxide shown, illustrated a synergistic effectiveness of about 25 minutes and 60 minutes, respectively, in comparison to the expected heat stability of only 20 minutes based on the performance of each of the components alone (See Tables I and II).

Therefore, Examples 56–61 demonstrated that an organotin sulfur-containing compound (DBT) and a metal component (calcium hydroxide) in combination provided a vinyl halide resin stabilization which was indeed superior and highly unexpected. Having demonstrated the stabilizing effectiveness of the combination of calcium hydroxide and DBT at certain levels within the ranges of 0.1–10 calcium hydroxide and 0.1–5 DBT, there are other levels within these ranges where synergistic results can be achieved.

EXAMPLES 62–64

To further illustrate the principles of this invention employing other organotin sulfur-containing compounds and metal components and the synergistic effects achieved by such combinations, Examples 62–64 were performed. In these examples, monobutyltin tris (isooctylthioglycolate) was substituted for the dibutyltin bis (isooctylthioglycolate) of the previous examples. Hereinafter, the monobutyltin tris (isooctylthioglycolate) is designated "MBT". Milling and oven testing for heat stability was performed as above. In Example 63, 0.5 phr MBT and 0.25 phr sodium carbonate were employed. In Example 64, 0.5 phr MBT was combined with 1.0 phr sodium carbonate. All examples were compared with a standard resin blank, and the results are shown in Table III.

TABLE III

| | Components | 375° F. Heat Stability Contribution |
|---|---|---|
| Example 62 | 0.5 MBT | 30' |
| Example 63 | 0.5 MBT 0.25 sodium carbonate | 45' |
| Example 64 | 0.5 MBT 1.0 sodium carbonate | 70' |

As reported in Table I, sodium carbonate alone at a level of 0.25 phr contributed no heat stabilizing effectiveness upon the blank. At a level of 1.0 phr alone, sodium carbonate contributed at most 10 minutes of heat stability to the resin blank. Also, as reported in Table III above, MBT at 0.5 phr contributed 30 minutes of heat stability to a resin blank. However, a combination of 0.5 phr MBT and 0.25 phr sodium carbonate displayed a heat stabilizing effectiveness of about 45 minutes upon the resin (Example 63). In comparison, the expected heat stability contribution of such a combination was 30 minutes because at a level of 0.25, sodium carbonate alone did not contribute to the heat stability of the resin and the MBT alone contributed about 30 minutes of heat stability. Accordingly, the synergistic effectiveness was demonstrated. In Example 64, quite similarly, at a level of 0.5 phr MBT and 1.0 phr sodium carbonate, a heat stability of 70 minutes was observed. This is to be compared with an expected heat stability of each of the components in the combination on the order of about 40 minutes. Again, quite unexpectedly, the heat stability of the combination was 30 minutes greater and far exceeded the expected heat stabilizing effectiveness.

EXAMPLES 65–70

For the purpose of illustrating the synergistic activity of the stabilizer compositions of this invention at a higher temperature, examples 65–70 were performed. A resin blank was formulated in accordance with the standard procedure above identified except that the wax was eliminated as a lubricating additive. Example 65 was the blank formulation which was milled for about 5 minutes at 350° F. followed by oven treatment at 400° F. The blank degraded within about 0–5 minutes. Examples 66–70 were performed under identical formulation and milling conditions with oven testing at 400° F., except that 1 phr of DBT was employed alone as a stabilizer in Example 66, 2 phr of sodium carbonate alone was added in Example 67, and 2 phr of calcium hydroxide alone was added in Example 68. Examples 69 and 70 employed the combination of components according to the principles of this invention. 1 phr DBT and 2 phr sodium carbonate were combined in Example 69; and 1 phr DBT and 2 phr calcium hydroxide were combined in Example 70. The results of oven heat stability testing appear in Table IV.

TABLE IV

| | Components | 400° F. Heat Stability Contribution |
|---|---|---|
| Example 65 | Resin blank formula | — |
| Example 66 | 1 DBT | 15–20' |
| Example 67 | 2 sodium carbonate | 0–5' |
| Example 68 | 2 calcium hydroxide | 0–4' |
| Example 69 | 1 DBT 2 sodium carbonate | 50' |
| Example 70 | 1 DBT 2 calcium hydroxide | 50' |

Examples 65–70 demonstrated the heat stabilizing synergistic effectiveness of the composition of this invention at the higher (400° F.) temperature. For example, control blank formulation in Example 65 became pink off the mill at 375° F. and degraded by darkening significantly within 5 minutes at 400° F. The sodium carbonate or calcium hydroxide at 2 phr alone provided little or no contribution to the heat stabilizing effectiveness of the resin blank itself (as demonstrated by Examples 67 and 68 which became red or dark red upon milling and a color degradation similar to the resin itself within about 5 minutes at 400° F. In Example 66, 1 phr DBT alone contributed a heat stabilizing effectiveness of about 15–20 minutes. However, the synergistic combination of either 2 phr sodium carbonate or 2 phr calcium hydroxide with 1 phr DBT (as demonstrated by Examples 69 and 70) did not blacken even after 50 minutes of oven heat stability testing at 400° F. Examples 69-70 were discontinued at 50 minutes. Indeed, where one would expect the combination of sodium carbonate or calcium hydroxide with DBT to be comparable to that of the DBT alone, rather a superior degree of stabilizing effectiveness was achieved.

EXAMPLES 71-72

The synergistic effectiveness of sodium bisulfite in combination with an organotin sulfur-containing compound (DBT) was demonstrated by Examples 71-72. To the standard resin formula, 1 phr sodium bisulfite was added alone (Example 72). For comparison, 1 phr sodium bisulfite and 1 phr DBT were added to the resin blank (Example 72). The results are reported in Table V, after milling for 5 minutes at 350° F. and oven testing at 375° F.

TABLE V

| | Components | 375° F. Heat Stability Contribution |
|---|---|---|
| Example 71 | 1 DBT | |
| | 1 sodium bisulfite | 70' |
| Example 72 | 1 sodium bisulfite | 0' |

As reported earlier, DBT alone at 1 phr contributed about 40 minutes to the heat stability of the standard resin blank. As demonstrated by Example 72, 1 phr sodium bisulfite made no material contribution to the heat stability of the blank. However, at 1 phr DBT and 1 phr sodium bisulfite in combination, the heat stability contribution was 70 minutes which demonstrated the synergism of sodium bisulfite as a metal component in the composition of this invention.

EXAMPLES 73-77

Potassium carbonate and bicarbonate have also been demonstrated to possess unique stabilization properties in our compositions with vinyl halide resins. Examples 73-77 were performed employing the combination of potassium carbonate or potassium bicarbonate with an organotin sulfur-containing compound (DBT). The standard resin formula was used with DBT alone, potassium carbonate alone, potassium bicarbonate alone, and combinations of each alkali metal component with DBT, on a parts per hundred resin basis as reported in Table VI as follows. Milling and heat stability testing were performed as above.

TABLE VI

| | Components | 375° F. Heat Stability Contribution |
|---|---|---|
| Example 73 | 1 DBT | 40' |
| Example 74 | 2 potassium carbonate | 0' |
| Example 75 | 1 DBT | |
| | 2 potassium carbonate | 95' |
| Example 76 | 2 potassium bicarbonate | 0' |
| Example 77 | 1 DBT | |
| | 2 potassium bicarbonate | 65' |

Again, the organotin component alone at 1 phr exhibited a contribution of 40 minutes to the heat stability of the resin blank (Example 73). Also, potassium carbonate at 2 phr did not materially contribute to the resin blank formula as demonstrated by Example 74. However, the combination of 1 phr DBT and 2 phr potassium carbonate contributed 95 minutes of heat stability to the resin blank which is an order of magnitude clearly unexpected for the combination in comparison to the performance of each of the components alone. Similarly, in Example 76, 2 phr potassium bicarbonate did not materially contribute to the performance of the blank. Whereas, the combination of 1 phr DBT and 2 phr potassium bicarbonate contributed 65 minutes of heat stability to the blank resin formula which far exceeded the expected contribution.

EXAMPLES 78-83

Other alkali bisulfites or metabisulfites in combination with an organotin sulfur-containing component have been demonstrated to possess remarkable heat stability. For this purpose, Examples 78-83 were performed in a manner similar to the preceding examples employing the standard blank resin and conducting heat stability tests at 375° F. This series of examples demonstrated the performance of potassium metabisulfite and sodium metabisulfite for comparison with an alkali bisulfite. The amounts of each of the components in phr and the test results are reported in Table VII as follows.

TABLE VII

| | Components | 375° F. Heat Stability Contribution |
|---|---|---|
| Example 78 | 0.5 DBT | 20' |
| Example 79 | 1 potassium metabisulfite | 0' |
| Example 80 | 1 sodium bisulfite | 0' |
| Example 81 | 0.5 DBT | |
| | 1 potassium metabisulfite | 35' |
| Example 82 | 0.5 DBT | |
| | 1 sodium bisulfite | 40' |
| Example 83 | 0.5 DBT | |
| | 1 sodium metabisulfite | 35' |

Examples 78-80 demonstrated that DBT alone contributed 20 minutes of heat stability to the blank, whereas either the potassium metabisulfite or sodium bisulfite did not materially contribute to the blank. Similarly, sodium metabisulfite alone at levels comparable to the level exemplified in Example 83 does not materially contribute to the blank. However, when the same amounts of the metal compounds were combined with the same amount of the organotin compound as demonstrated in Examples 81-83, synergistic performances were observed by comparison with previous Examples 78-80.

EXAMPLES 84-88

Other alkaline earth metal hydroxides have been demonstrated to provide the synergistic results for comparison with calcium hydroxide as above reported. Examples 84-88 were performed to demonstrate the synergistic results of barium hydroxide, Ba(OH)$_2$.H$_2$O, and strontium hydroxide, Sr(OH)$_2$.8H$_2$O, with the organotin component. Amounts of each of the components are reported in Table VIII alone and in combination as added to the standard resin blank on a phr basis along with the results of heat stability testing at 375° F.

TABLE VIII

| | Components | 375° F. Heat Stability Contribution |
|---|---|---|
| Example 84 | 0.5 DBT | 20' |
| Example 85 | 0.5 barium hydroxide | 0' |
| Example 86 | 0.5 strontium hydroxide | 0' |
| Example 87 | 0.5 DBT<br>0.5 barium hydroxide | 35' |
| Example 88 | 0.5 DBT<br>0.5 strontium hydroxide | 30' |

The organotin component alone at 0.5 phr demonstrated again a heat stability contribution of 20 minutes. Whereas, the barium hydroxide or strontium hydroxide component alone demonstrated no material contribution to the resin blank as reported in Examples 85–86 of Tables VIII. However the combination of the organotin component and either of the metal components demonstrated a synergistic heat stability as shown by Examples 87–88 of the table.

EXAMPLES 89–93

Synergisms have also been found for the combination of an alkali metal hydroxide and an organotin sulfur-containing compound. In Example 89, sodium hydroxide at 0.25 phr was employed alone in the standard resin blank formula and tested for heat stability by milling at 350° F. for about 5 minutes followed by oven testing at 375° F. No material heat stability contribution was observed. For comparison, 0.25 phr was combined with DBT at 1 phr and tested under identical conditions in Example 90 and the heat stability contribution of the combination was about 70 minutes. When these results are compared with the DBT alone at 1 phr with the standard resin blank as for example in Table I above, synergism is demonstrated.

In Example 91, lithium hydroxide (LiOH.H₂O) was tested under conditions similar to sodium hydroxide above except that 1 phr of lithium hydroxide was employed with the standard resin blank and 0.5 phr dioctyltin bis (isooctylthioglycolate) was substituted for DBT. A heat stability contribution of about 80–90 minutes was observed. For comparison, Example 92 was run in which 0.5 phr of dioctyltin bis (isooctylthioglycolate) was employed alone and a heat stability contribution of about 20 minutes was observed. However, when Example 93 was run for 1 phr lithium hydroxide alone, no material contribution was observed. Thus, Examples 91–93 demonstrated that the combination of lithium hydroxide and organotin, like sodium hydroxide at certain levels with organotin, exhibits synergism according to the principles of this invention.

In each of the above examples, the vinyl halide resin which was employed is a homopolymer of vinyl chloride, i.e., polyvinyl chloride. It is to be understood, however, that this invention is not limited to a particular vinyl halide resin such as polyvinyl chloride, of course. Other halogen-containing resins which are employed and illustrate the principles of this invention include chlorinated polyethylene, chlorinated polyvinyl chloride and the vinyl halide resin type. Vinyl halide resin, as understood herein, and as appreciated in the art, is a common term and is adopted to define those resins or polymers usually derived by polymerization or copolymerization of vinyl monomers including vinyl chloride with or without other comonomers such as ethylene, propylene, vinyl acetate, vinyl ethers, vinylidene chloride, methacrylate, styrene, etc. A simple case is the conversion of vinyl chloride H₂C:CHCl to polyvinyl chloride $(CH_2-CHCl-)_n$ wherein the halogen is bonded to the carbon atoms of the carbon chain of the polymer. Other examples of such vinyl halide resins would include vinylidene chloride polymers, vinyl chloride-vinyl ester copolymers, vinyl chloride-vinyl ether copolymers, vinyl chloride-vinylidene copolymers, vinyl chloride-propylene copolymers, chlorinated polyvinyl chloride, and the like. Of course, the vinyl halide commonly used in the industry is the chloride, although others such as bromide and fluoride may be used.

It is also to be understood that other components such as lubricants, processing aids, pigments, other stabilizers, other non-halogenated resins, etc., can be incorporated in the resin compositions and the benefits of this invention can be achieved. Accordingly, other modifications will become apparent in view of the teachings herein without departing from the true spirit and scope of this invention.

What is claimed is:

1. A resin stabilizer composition which consists essentially of, an organotin sulfur-containing compound having a

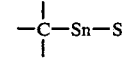

group, and a metal compound selected from the group consisting of an alkali metal bisulfite, metabisulfite and mixtures of said metal compounds, said organotin and metal compound components in relative amounts which together provide a synergistic stabilizing effectiveness upon said resin.

2. The composition of claim 1 wherein said organotin sulfur-containing compound is selected from the group consisting of an organotin mercaptide, organotin mercaptoacid, organotin mercaptoacid ester, organotin sulfide, and organo thiostannoic acid, and mixtures thereof.

3. The composition of claim 1 wherein said components are present in a weight ratio in the range of about 0.1–5 of the organotin component to about 0.1–10 of the metal component.

4. A vinyl halide resin composition which comprises a vinyl halide resin and, as a heat stabilizer, an effective amount of a composition consisting essentially of, an organotin sulfur-containing compound having a

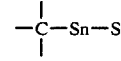

group, and a metal compound selected from the group consisting of an alkali metal bisulfite, metabisulfite and mixtures of said metal compounds, said organotin and metal compound components in relative amounts which together provide a synergistic stabilizing effectiveness upon said resin.

5. The composition of claim 4 wherein said organotin sulfur-containing compound is selected from the group consisting of an organotin mercaptide, organotin mercaptoacid, organotin mercaptoacid ester, organotin sulfide, and organo thiostannoic acid, and mixtures thereof.

6. The composition of claim 4 wherein said effective amount is on the order of about 0.2 to about 15 parts by weight per 100 parts resin.

7. The composition of claim 4 wherein the relative amount of said organotin component is in the range of about 0.1 to about 5 parts by weight per 100 parts resin and the relative amount of metal compound present is in the range of about 0.1 to about 10 parts by weight per 100 parts resin.

8. The composition of claim 4 wherein the organotin sulfur-containing compound is selected from a group consisting of dibutyltin bis (isooctylthioglycolate), monobutyltin tris (isooctylthioglycolate), dibutyltin dilaurylmercaptide, butyl thiostannoic acid, dioctyltin bis (isooctylthioglycolate), dimethyltin bis (isooctylthioglycolate), monomethyltin tris (isooctylthioglycolate), dibutyltin bis (isooctyl-beta-mercapto-propionate), and mixtures thereof.

9. The composition of claim 4 wherein the metal compound is selected from a group consisting of sodium bisulfite, sodium metabisulfite, potassium metabisulfite, and mixtures thereof.

10. The composition of claim 8 wherein the relative amount of said organotin component is in the range of about 0.1 to about 5 parts by weight per 100 parts resin and the relative amount of metal compound present is in the range of about 0.1 to about 10 parts by weight per 100 parts resin.

11. A vinyl halide resin composition which comprises a vinyl halide resin and, as a heat stabilizer, an effective amount of a composition consisting essentially of, an organotin sulfur-containing compound selected from the group consisting of dibutyltin bis (isooctylthioglycolate), monobutyltin tris (isooctylthioglycolate), dibutyltin dilaurylmercaptide, butyl thiostannoic acid, dioctyltin bis (isooctylthioglycolate), dimethyltin bis (isooctylthioglycolate), monomethyltin tris (isooctylthioglycolate), dibutyltin bis (isooctyl-beta-mercapto-propionate), and mixtures thereof, and a metal compound selected from the group consisting of sodium bisulfite, sodium metabisulfite, potassium metabisulfite and mixtures thereof, said organotin and metal compound components in relative amounts which together provide a synergistic stabilizing effectiveness upon said resin.

12. The composition of claim 11 wherein said effective amount is on the order of about 0.2 to about 15 parts by weight per 100 parts resin.

13. The composition of claim 12 wherein the relative amount of said organotin component is in the range of about 0.1 to about 5 parts by weight per 100 parts resin and the relative amount of metal compound present is in the range of about 0.1 to about 10 parts by weight per 100 parts resin.

* * * * *